Patented July 27, 1954

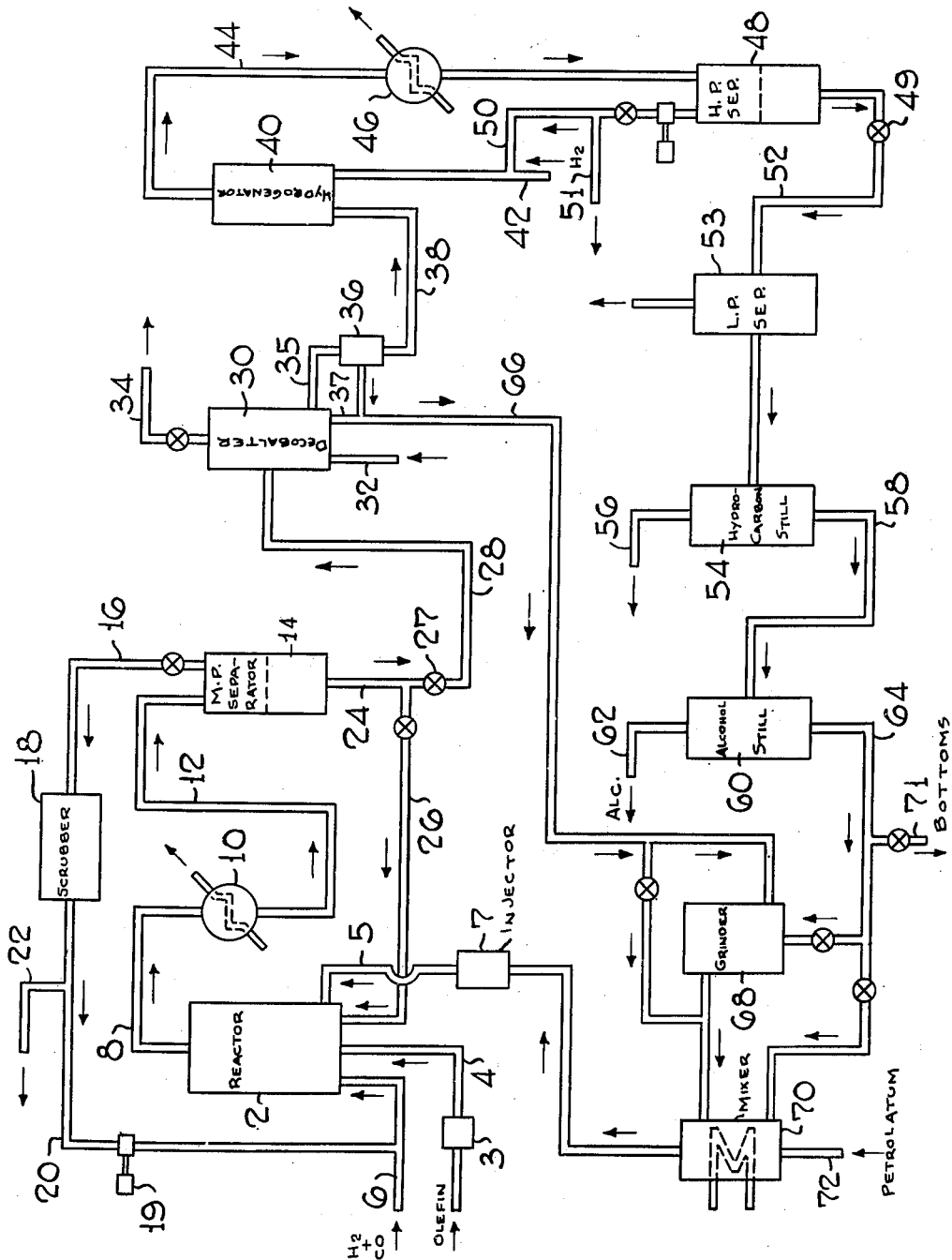

2,684,986

UNITED STATES PATENT OFFICE 2,684,986

OXO PROCESS USING CATALYST PASTE

Rhea N. Watts and Robert W. Krebs, Baton Rouge, La., and Stanley C. Lane, Roselle, N. J., assignors to Standard Oil Development Company, a corporation of Delaware Application December 23, 1949, Serial No. 134,764

19 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process for reusing the spent catalyst in the reaction.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three-stage process. In the first stage, the olefinic material, catalyst and the proper proportion of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus straight and branch chained olefins and diolefins such as propylene, butylene, pentene, hexene, butadiene, pentadiene, styrene, olefin polymers such as di- and tri-isobutylene and hexene and hepteme dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalysts in the first stage of the process may be added in the form of salts of the catalytically active metal with high molecular fatty acids, such as stearic, oleic, palmitic, naphthenic, etc., acids. Thus, suitable catalysts are, for example, cobalt oleate or naphthenate or iron linoleate. These salts are soluble in the liquid olefin feed or in liquid products from the reaction and may be supplied to the first stage as hydrocarbon solution or dissolved in the olefin feed or in a stream of recycled product. Also, it has been proposed to employ catalyst deposited on a carrier, preferably activated with thoria in the form of a slurry and employ the supported cobalt metal in the slurry directly rather than the metal soap.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture, and it is to this stage that the present invention applies.

One of the major problems involved in adapting the aldehyde synthesis process to commercial scale operation is the problem of the catalyst balance. The catalyst such as cobalt, irrespective as to the form in which it is added in the synthesis stage, is appreciably converted to a soluble form, principally the carbonyl and this carbonyl as well as any dissolved or suspended solids must be removed before the final hydrogenation stage, because otherwise it would tend to decompose in and plug up the equipment in the hydrogenation system and also inactivate the hydrogenation catalyst. Thus, prior to the hydrogenation system, the cobalt carbonyl is decomposed, for example, by heating at relatively low pressures and temperatures in the presence of a stripping gas in a catalyst decomposition zone, called a decobalter, and the finely-divided metal along with minor quantities of iron, is removed in the form of a settled sludge or filter cake. This material contains the major portion of the cobalt catalyst fed to the process, and it is of course, highly desirable to recover this metal and return it to the primary synthesis reactor by the simplest and cheapest method possible and in a manner consistent with acceptable catalytic activity and freedom from maintenance difficulties with the equipment. The economic feasibility of the whole alcohol synthesis process may depend in large measure upon this catalyst recovery, particularly where light olefins are being reacted.

There have been several proposals in the past for utilization of the cobalt precipitated in the decomposition zone by heat and hydrogen. One such is the extraction of the precipitated metal with mineral acid, conversion of the mineral acid salt into organic cobalt salt, and reuse of the latter in the synthesis stages, a relatively costly and uneconomic procedure. Another proposal has been to reconvert the precipitated cobalt metal with carbon monoxide back to cobalt carbonyl, which then can be dissolved in olefin or alcohol and used as cobalt concentrate in the reactor feed. Among other disadvantages is the fact that for this purpose practically pure CO is required, to prevent formation of undesired hydrocarbon synthesis products. Another disadvantage is the fact that large high pressure vessels are required for carbonyl formation. On a commercial basis, these are definitely uneconomic factors.

It is the principal object of the present invention to provide an improved process for re-employing spent cobalt carbonylation cataylst is a continuous synthesis reaction wherein alcohols are produced from olefins.

Other objects and advantages of the invention will become apparent from the description hereinafter.

It has now been found that the cobalt metal cake, after suitable dispersion, but without conversion into a cobalt compound, may be employed per se in the catalytic formation of aldehydes and alcohols from olefins irrespective of the form in which the cobalt was originally introduced into the reactor. It has been found that the untreated cobalt cake itself is an excellent catalyst for the aldehyde synthesis reaction, and reacts readily with CO and $H_2$ to form the active species of the catalyst, probably cobalt hydrocarbonyl.

In accordance with the present invention, the catalyst metal cake from the decobalting system is ground, if necessary, to a fine state of subdivision, preferably to a particle size less than 325 mesh, in a suitable liquid vehicle, such as the bottoms product from the distillation of the final alcohol product. To the ground material, there is added sufficient neutral organic paste-forming material, such as petrolatum or paraffin wax or a cobalt soap concentrate, so as to form a paste or gel of uniform composition containing, for example, 50% cobalt, which is then injected into the primary reactor to aid in the conversion of olefins.

Prior to the present invention it has been proposed to employ as catalyst, a slurry consisting of cobalt metal prepared on an inert carrier suspended in a liquid stream. Such slurries, however, are unstable and have erosive effects upon equipment, in particular, circulating pumps. In the process of the present invention, such erosion is avoided.

In pumping slurries of high density solids, it is difficult to keep a uniform solid concentration, and therefore, to control the catalyst input as desired. By forming a stable paste or gel, uniform injection of metal can be controlled at will. In the prior art cases in which an inert carrier was used, the relatively low-density carrier solid helped to make slurry formation feasible. However, the carrier had to be kept suspended throughout the entire synthesis system to prevent plugging of the equipment, and had to be removed and re-impregnated with cobalt metal for return to the system. In the method of the present invention, the presence of any substantial proportion of inert solids in the process stream is avoided.

The present invention and its application will best be understood from the more detailed description hereinafter, wherein reference will be made to the accompanying drawing, which is a schematic representation of a system suitable for carrying out a preferred embodiment of the invention. In the embodiment in the drawing there is shown a carbonylation system, catalyst removal system, a gel formation system and a catalyst injection system whose function and cooperation are detailed below. Referring now to the diagram, an olefinic hydrocarbon having one carbon atom less than the number of carbon atoms in the desired resulting oxygenated compound is fed through preheater 3 and line 4 to the bottom portion of primary reactor 2. The latter comprises a reaction vessel which may, if desired, be packed with non-catalytic material such as Raschig rings, porcelain chips, pumice, and the like. Reactor 2 may be divided into discrete packed zones, or it may comprise but a single reaction zone.

When starting up operations, the olefinic feed may, if desired, contain dissolved therein, 1–3% by weight of cobalt naphthenate based on olefin. Other soluble compounds of cobalt may also be used or a concentrated catalyst solution may be fed as a separate stream. However, as the run proceeds, the dissolved cobalt is gradually cut back and the catalyst is injected in accordance with the process of the present invention.

Cobalt paste, prepared in a manner described more fully below, is continuously injected into reactor 2 through injector line 5, proceeding from injector 7. The paste, which consists of about 50% by weight of finely ground cobalt, may be injected at the rate of 0.5 to 1.5 pounds per barrel of feed olefin, preferably at pressures equal to or slightly higher than those prevailing in reactor 2. A system suitable for the paste injection may comprise a pair of blowcases or feed cylinders, each of which is filled periodically with paste while the other is being discharged to the reactor by suitable gas pressure, or by a hydraulically or mechanically driven plunger or piston.

Simultaneously, a gas mixture comprising $H_2$ and CO in the approximate ratio of 0.5 to 2 volumes of $H_2$ per volume of CO is supplied through line 6 to primary reactor 2 and flows concurrently through reactor 2 with liquid olefin feed and dispersed catalyst. Reactor 2 is preferably operated at a pressure of about 2500–3500 p. s. i. g. and at a temperature of about 250°–450° F., depending upon the olefin feed and other reaction conditions. As a result of the reaction between cobalt and synthesis gases, cobalt carbonyls are formed, and it is commonly believed to be the hydrocarbonyl which catalyzes the conversion of olefins to aldehydes. The rates of flow of olefin, catalyst and synthesis gases through reactor 2 are so regulated and the temperatures so maintained that the desired conversion level of the olefin is obtained.

Liquid oxygenated reaction products containing cobalt carbonyl cataylst in solution, and unreacted synthesis gases are withdrawn overhead from an upper portion of high pressure reactor 2 and are transferred through line 8 to cooler 10 in which any conventional means of cooling are employed, and from thence via line 12 to high pressure separator 14 where unreacted gases are withdrawn overhead through line 16, scrubbed in scrubber 18 of entrained liquid and cobalt carbonyl and used in any way desired. They may be recycled to synthesis gas feed line 6 via line 20 and booster compressor 19, or purged through line 22.

A stream of primary reaction product containing dissolved therein, relatively high concentration of cobalt carbonyl is withdrawn from separator 14 through line 24. A portion of said withdrawn stream may be recycled, if desired, to reactor 2 via line 26 and injected at suitable points in the reaction zone to aid in the cooling and maintenance of temperature control of the primary carbonylation stage. The balance of the primary reaction product may be withdrawn through pressure release valve 27 and through line 28 and passed to catalyst removal or decobalting zone 30, wherein dissolved catalyst is decomposed to the metal, for example, by suitable heat treatment at about 300°–400° F. A stream of hydrogen-comprising gas may be admitted to zone 30 through line 32 to aid in stripping and removing the evolved carbon monoxide resulting from the decomposition of the metal carbonyl. Zone 30 may be operated at high pressures, though low pressures in the range of 15–200 p. s. i. g. may also be employed. If desired, it may be advantageous to operate with two or more decobalters, switching the stream from one to the other as the vessel in service accumulates excessive cobalt metal. The gas stream comprising $H_2$ and CO may be removed from zone 30 through line 34 and used in any manner desired.

The liquid carbonylation reaction product now substantially free of dissolved cobalt is withdrawn from catalyst removal zone 30 through line 35 to a metal recovery zone 36 whose operation is detailed more fully below. The metal-free liquid product is then passed through line 38 to the lower portion of hydrogenator 40. Simultaneously, hydrogen is supplied to reactor 40 through line 42 in proportions sufficient to convert the organic carbonyl compounds in the oxygenated feed into the corresponding alcohols. Hydrogenator 40 may contain a mass of any conventional hydrogenation catalyst, such as nickel, copper chromite, cobalt, sulfactive catalysts of the type of oxides and sulfides of tungsten, nickel, molybdenum and the like, either as such or supported on a carrier. Depending upon the catalyst, reactor 40 may be operated at pressures from 2500–4500 p. s. i. g. and at temperatures of from about 300°–600° F. and an $H_2$ feed rate of from about 5000 to 20,000 normal cubic feet per barrel of feed.

The products of the hydrogenating reaction may be withdrawn overhead through line 44, then through cooler 46 into high pressure separator 48, where unreacted hydrogen may be withdrawn overhead through line 50 for further use in the system, if desired, or for purging through line 51. Liquid products are withdrawn from separator 48 through pressure release valve 49 and line 52 to a low pressure gas separator 53, and are then passed to hydrocarbon still 54, where dissolved gases and low boiling products, mostly hydrocarbons boiling below the alcohol product desired are distilled overhead. Thus, when a $C_7$ polymer olefin fraction is the feed to carbonylation reactor 2, generally the product boiling up to 340° F. is removed as a heads cut in hydrocarbon still 54. This material may be withdrawn overhead through line 56 and may be used as a gasoline blending agent or in any other desired manner. The bottoms from this primary distillation are withdrawn from still 54 and are sent through line 58 to alcohol still 60 where the product alcohols boiling in the desired range may be removed overhead through line 62 by distillation at atmospheric or reduced pressures, depending upon their molecular weight. The bottoms from this distillation may be further employed as a vehicle for the cobalt metal formed in decobalting zone 30.

The metal recovery zone 36 may consist of apparatus such as a settler or filter for eliminating finely divided metal particles from the liquid. Hold-up time may be provided before final metal removal to permit sufficient agglomeration to facilitate removal of the last trace of metal. It is usually desired to clarify the liquid to a content of total metal, dissolved and suspended, of not over 0.005% by weight. It is also desirable to accomplish this in apparatus which prevents deposition of the metal on the walls, or settling out at multiple points, in order to remove the metal conveniently either by continuous withdrawal or by periodic emptying or dumping from one of two alternate collecting vessels.

Cobalt metal removed as a cake or sludge from recovery zone 36 may be conveyed through line 66 to a suitable grinding apparatus as ball mill 68 for grinding to the desired size, if necessary. Also, any residual settled cobalt sludge formed in decobalter 30 may be withdrawn from the bottom of that vessel and passed through lines 37 and 66 to grinder 68. In one embodiment of the invention, alcohol distillation bottoms are withdrawn from still 60 through line 64 and a portion of these bottoms comprising principally esters, acetals, and polymeric material, are added to form a suitable vehicle for the cake to be ground. Preferably the proportions are about 0.5 to 1 pound bottoms per pound cobalt cake. The finely ground material is then passed to mixer 70, equipped with steam coils and agitator, and the product heated above the melting point of petrolatum. Molten petrolatum or paraffin wax is added through line 72 in quantities sufficient to form a gel or paste, containing about 50% cobalt, of uniform composition. The resulting blend is mixed well, cooled, and the paste is passed to injector 7, whence it is injected into reactor 2 through line 5. About 50% is a typical concentration of metal, but other concentrations may be used as desired, for convenience in handling and injecting the paste.

Not all the bottoms need be thus added, and some bottoms product may be removed through line 71. Also, it may be desirable under some conditions, as when the cake is formed of adequately small particles, to omit the grinding step.

As an example of a petrolatum bearing cobalt paste, a 400 cc. batch was prepared as follows:

Two hundred grams of cobalt metal cake was ground for 24 hours in a ball mill with 100 cc. of alcohol distillation bottoms. This mixture was heated above the melting point of petrolatum and 100 cc. of molten petrolatum was added, mixed well and allowed to cool. The resulting paste was stable and contained finely divided cobalt throughout. It was miscible with the feed to the primary reaction zone and the paste-forming hydrocarbon constituents could be satisfactorily removed from the final product with the bottoms cut from the fractionator.

The process of the present invention may be further illustrated by the following specific example.

In another experiment, four cobalt catalysts were compared under the same conditions of cobalt to olefin feed ratio, temperature, pressure and feed space velocity. Catalyst A was the conventional but expensive cobalt naphthenate solution in olefin feed. Catalyst B was a paste prepared in a manner similar to that described in the preceding paragraph but using decobalter cake which had been roasted in air and re-reduced. Catalyst C was like catalyst B but was not reduced after roasting. Catalyst D was a mixture of the raw sludge from a cobalt recovery drum located in the product stream after an oxonation reactor. This sludge was converted to a paste simply by admixture with petrolatum. As will be seen from the following data, these catalysts gave equivalent conversion of $C_7$ olefins under typical Oxo reaction conditions.

| Catalyst | A | B | C | D |
|---|---|---|---|---|
| Feed | $C_7$ Olefin Cut | $C_7$ Olefin Cut | $C_7$ Olefin Cut | $C_7$ Olefin Cut. |
| Pressure, p. s. i. g | 3,000 | 3,000 | 3,000 | 3,000. |
| Temperature, °F | 350 | 350 | 350 | 350. |
| Feed Rate, V./V./Hr | 0.6 | 0.6 | 0.6 | 0.6. |
| Wt. Percent Cobalt in Feed | 0.3 to 0.35 | 0.3 to 0.35 | 0.3 to 0.35 | 0.3 to 0.35. |
| Olefin Conv., Percent | 77 | 77 | 76 | 77. |

The catalyst mixtures employed in practicing this invention have been referred to as pastes. They may be variously described as pasty, gelatinous, or grease-like, or as materials having a "buttery" consistency. In order to describe them more specifically, reference may be made to the scientific terminology as employed in standard texts on rheology, such as, for example, "Industrial Rheology and Rheological Structures," by Henry Green, published in 1949 by John Wiley & Sons, Inc., New York. In rheology, fluids are commonly classified according to their flow behavior as Newtonian or non-Newtonian, and the latter may exhibit several types of behavior, one of which is called plastic flow. It is a distinguishing feature of this invention to employ catalyst mixtures which at ordinary temperatures from about 50° F. to about 150° F., behave as non-Newtonian fluids possessing plastic flow properties.

In presenting the consistency or flow properties of fluids it is common practice to plot consistency curves on rectangular coordinates of which the abscissae represent a function of the shear stress inducing the flow, as for example the torque applied to a rotational viscometer or the pressure applied to a tube-type viscometer. The ordinates represent a function of shear rate, as for example the rotational velocity or the rate of flow. For ordinary liquids, exhibiting Newtonian flow, the curve so plotted is a straight line, within the usual range of operation, passing through the origin, and its slope is a function of the viscosity of the liquid. For fluids exhibiting plastic flow the consistency curve has a curved portion at low rates of shear and a substantially linear portion at higher rates of shear. The slope of this linear portion alone is usually called the plastic viscosity, and when this portion is extrapolated to zero rate of shear the intercept on the stress axis is termed the yield value, usually expressed in dynes per square centimeter.

The yield value may be looked upon as a minimum stress which must be applied to induce any substantial flow. In the process of this invention the catalyst mixtures employed are so prepared as to possess yield values from about 200 to about 75,000 dynes per square centimeter. By employing mixtures exhibiting plastic flow, with yield values in this range, the catalyst mixture remains uniform in cobalt concentration and the rate of cobalt input to the reactor can be more satisfactorily controlled than would be the case with an unstable suspension in an ordinary liquid exhibiting no yield value.

Furthermore, an appreciable yield value will prevent sedimentation difficulties in the catalyst handling system. However, it is not desirable to employ a mixture having too high a yield value since this will require an unnecessarily large amount of metal soap, petrolatum, or the like to form the mixture, will make the mixing and preparation of the uniform mixture more difficult and will require an excessive pressure in the equipment used to inject the mixture into the reactor.

One method of obtaining fluids having suitable yield values is to employ in the mixture a wax or other fusible material which imparts to the mixture a plastic consistency at temperatures below the softening point of the mixture. It is convenient to inject the mixture at temperatures of 50°–150° F. and therefore, when using a material which has a softening or liquifying point, this point should be in or above this temperature range.

The process of the invention admits of numerous modifications apparent to those skilled in the art. Thus, it may, under certain conditions, be desirable to use the injected paste as a catalyst augmenting agent and add simultaneously dissolved catalyst with the feed and injected as described. Also, if desired, it may be desirable to add minor quantities of cobalt soaps or cobalt salts to the paste before injection.

Thus, in another embodiment of the invention, the metal is mixed with organic liquids, such as hydrocarbons, etc. containing sufficient cobalt soap to form a non-Newtonian fluid or gel. Cobalt stearate and oleate are examples, but other cobalt soaps may be used which have limited solubility in the liquid and give a pasty or gelatinous mixture. Olefin feed can be used as the hydrocarbon, or other hydrocarbons of suitable boiling range such that they do not contaminate the distilled alcohol product. Also, it may be desirable under certain circumstances, to subject the ground cobalt cake to a hydrogenation process before forming the paste.

Furthermore, fresh catalyst supply, either for normal operation, for starting up, or make-up for metal losses, may be in the form of paste made either from fresh metallic cobalt, metal recovered from a previous operation, or cobalt in the form of compounds which do not introduce objectionable anions or impurities into the system. Examples of compounds which are suitable are cobalt oxides, hydroxides, carbonates and formate. In accordance with the present invention, any cobalt or iron-containing solid dispersed in a non-Newtonian fluid, paste, gel or grease may be introduced as catalyst into the reaction zone.

Other modifications apparent to those skilled in the art are within the scope of the invention.

What is claimed is:

1. In a continuous carbonylation process wherein olefinic carbon compounds, CO and $H_2$ are contacted in a carbonylation zone at elevated temperatures and pressures with a carbonylation catalyst under conditions to produce aldehydes containing one more carbon atom than said olefinic carbon compound, the improvement which comprises injecting into said zone, at a pressure at least equal to that obtaining in said zone, a non-Newtonian fluid exhibiting appreciable plastic flow at injection temperatures and having suspended therein finely divided unsupported catalyst-comprising solid.

2. In a continuous carbonylation process wherein olefinic carbon compounds, CO and $H_2$ are contacted in a carbonylation zone at elevated temperatures and pressures with a cobalt carbonylation catalyst under conditions to produce aldehydes containing one more carbon atom than said olefinic carbon compound, the improvement which comprises injecting into said zone, at a pressure at least equal to that obtaining in said zone, a non-Newtonian fluid exhibiting appreciable plastic flow at injection temperatures and having suspended therein a finely divided cobalt-comprising solid.

3. The process of claim 2 wherein said fluid exhibits plastic flow properties with yield point above about 200 dynes per square centimeter at injection temperatures.

4. The process of claim 2 wherein said finely divided solid is cobalt metal.

5. The process of claim 2 wherein said finely divided solid is an oxide of cobalt.

6. The process of claim 2 wherein said finely divided solid is a cobalt salt.

7. The process of claim 2 wherein said finely divided solids are suspended in a thickening medium miscible with the products of the reaction.

8. The process of claim 7 wherein said medium is paraffin wax.

9. The process of claim 7 wherein said medium is petrolatum.

10. The process of claim 7 wherein said medium is a gelled organic liquid wherein is dispersed a minor proportion of a cobalt soap.

11. The process of claim 10 wherein said organic liquid is a hydrocarbon.

12. The process of claim 2 wherein said fluid has a softening point above the temperature of injection into said carbonylation zone.

13. In a continuous carbonylation process wherein olefinic carbon compounds, CO and $H_2$ are contacted in a carbonylation zone at elevated temperatures and pressures with a cobalt carbonylation catalyst under conditions to produce aldehydes containing one more carbon atoms than said olefinic carbon compound, and wherein a liquid reaction product comprising aldehydes and dissolved cobalt carbonyl is passed to a catalyst decomposition zone wherein cobalt carbonyl is decomposed to form a cobalt-containing sediment, the improvement which comprises removing said sediment from said catalyst decomposition zone, forming at least a portion thereof into a paste, and injecting said paste into said carbonylation zone, said paste exhibiting appreciable plastic flow at injection temperatures.

14. The process of claim 13 wherein said sediment is roasted prior to incorporation into said paste.

15. The process of claim 14 wherein said roasted sediment is reduced prior to incorporation into said paste.

16. The process of claim 13 wherein cobalt sediment removed from said catalyst decomposition zone is ground to a particle size preferably smaller than about 325 mesh.

17. The process of claim 16 wherein said sediment is ground in the presence of a liquid organic medium.

18. The process of claim 17 wherein said medium is the bottoms product from the distillation of alcohols formed in the subsequent hydrogenation of said aldehydes.

19. The process of claim 13 wherein said paste contains about 50% by weight of cobalt.

References Cited in the file of this patent

UNITED STATES PATENTS

| Number | Name | Date |
|---|---|---|
| 1,936,819 | Bayer | Nov. 28, 1933 |
| 2,327,066 | Roelen | Aug. 17, 1943 |
| 2,424,811 | Freed | July 29, 1947 |
| 2,440,109 | Moore | Apr. 20, 1948 |
| 2,509,878 | Owen | May 30, 1950 |
| 2,609,346 | Faulkner | Sept. 2, 1952 |

FOREIGN PATENTS

| Number | Country | Date |
|---|---|---|
| 651,144 | Great Britain | Mar. 14, 1951 |

OTHER REFERENCES

CIOS Target No. C 22/196 Report on Inspection of Oxo Plant at Ruhrchemie Oberhausen-Holden June 18, 1945, page 3.